INVENTOR
DON E. CARTER
BY
Robert J. Schaap
ATTORNEY

United States Patent Office 3,490,592
Patented Jan. 20, 1970

3,490,592
APPARATUS FOR PRODUCING FILTER CAKES
AND RECOVERING A PROCESS FILTRATE
THEREFROM
Don E. Carter, St. Louis, Mo., assignor to Monsanto
Company, St. Louis, Mo., a corporation of Delaware
Filed Aug. 2, 1965, Ser. No. 476,596
Int. Cl. B01d 23/24
U.S. Cl. 210—106
2 Claims

ABSTRACT OF THE DISCLOSURE

The method of reclaiming alkyl benzene from a filter cake material by introducing water into the filter cake-alkyl benzene mixture where the water preferentially wets the filter cake and is immiscible with the alkyl benzene, agitating the mixture to cause a surface displacement of the alkyl benzene from the filter cake and permitting a settling of the slurry thus formed so that the water and filter cake mixture and the alkyl benzene form distinct liquid layers thereby enabling the separating of the alkyl benzene from the water slurry. The process for performing this separation and the process for adding a filter cake to a filter by a recycling technique is also included.

---

Figure 1:
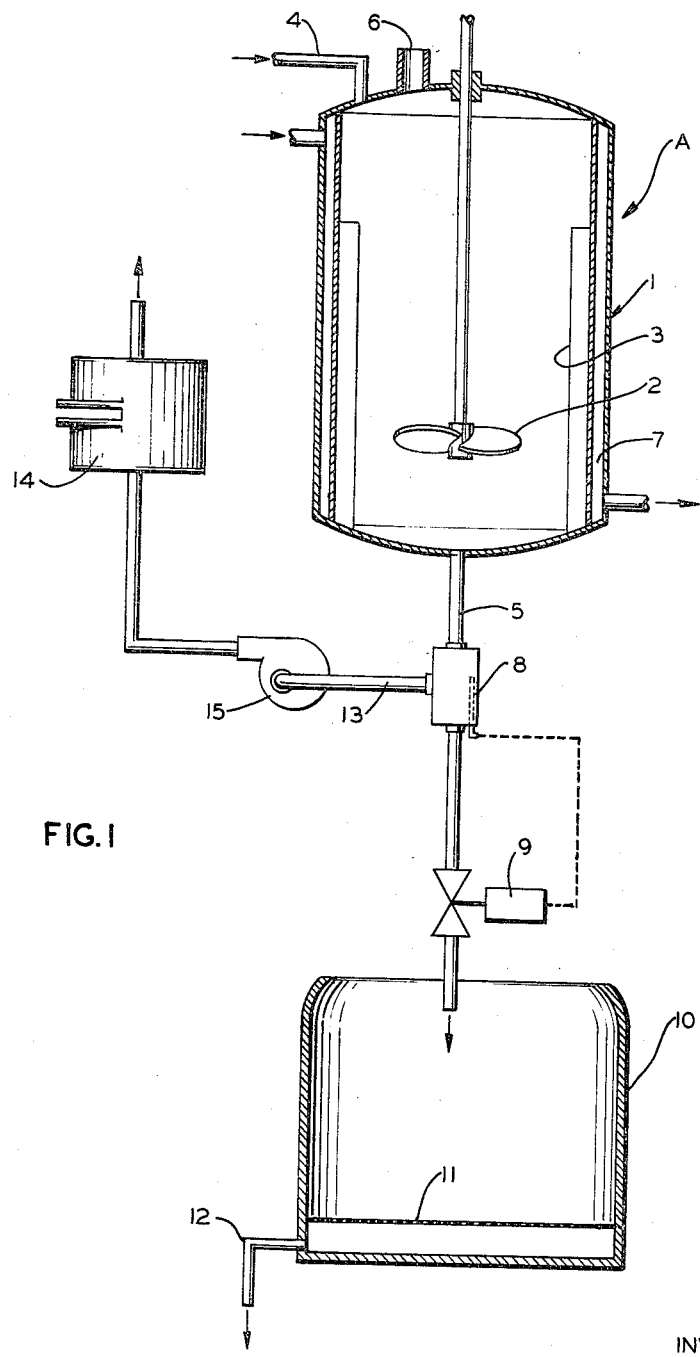

This invention relates in general to certain new and useful improvements in a method and apparatus for recovering a process filtrate from a filter cake, and more particularly to a method and apparatus for producing filter cakes and thereafter separating the process filtrate from the filter cake in a recovery process.

In the preparation of many organic hydrocarbon compounds, it is a common practice to filter such materials in order to remove process impurities and discoloration. In the industry, it is customary to use a filtering aid such as kieselguhr or diatomaceous earth or a similar material. This type of material tends to form a spongy or porous surface on a filter cloth or filter leaf and prevents gummy substances from clogging the pores of the filter cloths. After continuous and extensive use, it is necessary to collect the filtering aid and remove the same from the filtering cloth as the aid becomes saturated with the impurities. However, the filter aid normally tends to collect rather substantial amounts of the filtered product, which in some cases may be rather expensive. This problem is particularly acute in cases where large quantities of the product are filtered, such as in leaf type filters, where large surface areas are employed.

In order to reclaim the filtrate product, it has been a common practice to employ methods of steam distillation. The steam would generally pass through the filter cake and cause the filtrate to vaporize and the vapor could thereafter be condensed and collected. However, this process is rather expensive and not particularly effective. Another method which has been employed in the prior art is to wash the filtrate with a solvent which is less expensive than the filtrate itself. The filtrate contained in the filter cake would then be dissolved by the solvent and recovered therefrom. However, this involved the use of a solvent which, in itself, was somewhat expensive and also involved the employment of an additional process for separating the filtrate from the wash solvent. Accordingly, this process was not particularly effective. Because of the ineffectiveness of each of the aforementioned processes, many producers of organic hydrocarbons do not employ any process for removal of the filtrate from the filtered cake, which constitutes an economic loss and in turn, increases the cost of producing the organic hydrocarbon material.

It is, therefore, the primary object of the present invention to provide a highly efficient method and apparatus for reclaiming a process filtrate from a filter cake.

It is another object of the present invention to provide a process and a method of the type stated which does not involve the employment of additional costly solvent systems for absorbing the filtrate from the filter cake.

It is a further object of the present invention to provide a method and apparatus of the type stated which involves a relatively low equipment cost and is economical and efficient in operation.

It is also an object of the present invention to provide a process and apparatus for continually depositing a filter cake on filter leaves, filtering a hydrocarbon product through the filter cake and thereafter reclaiming the hydrocarbon product from the filter cake.

With the above and other objects in view, my invention resides in the novel features of form, construction, arrangement and combination of parts presently described and pointed out.

Figure 2:
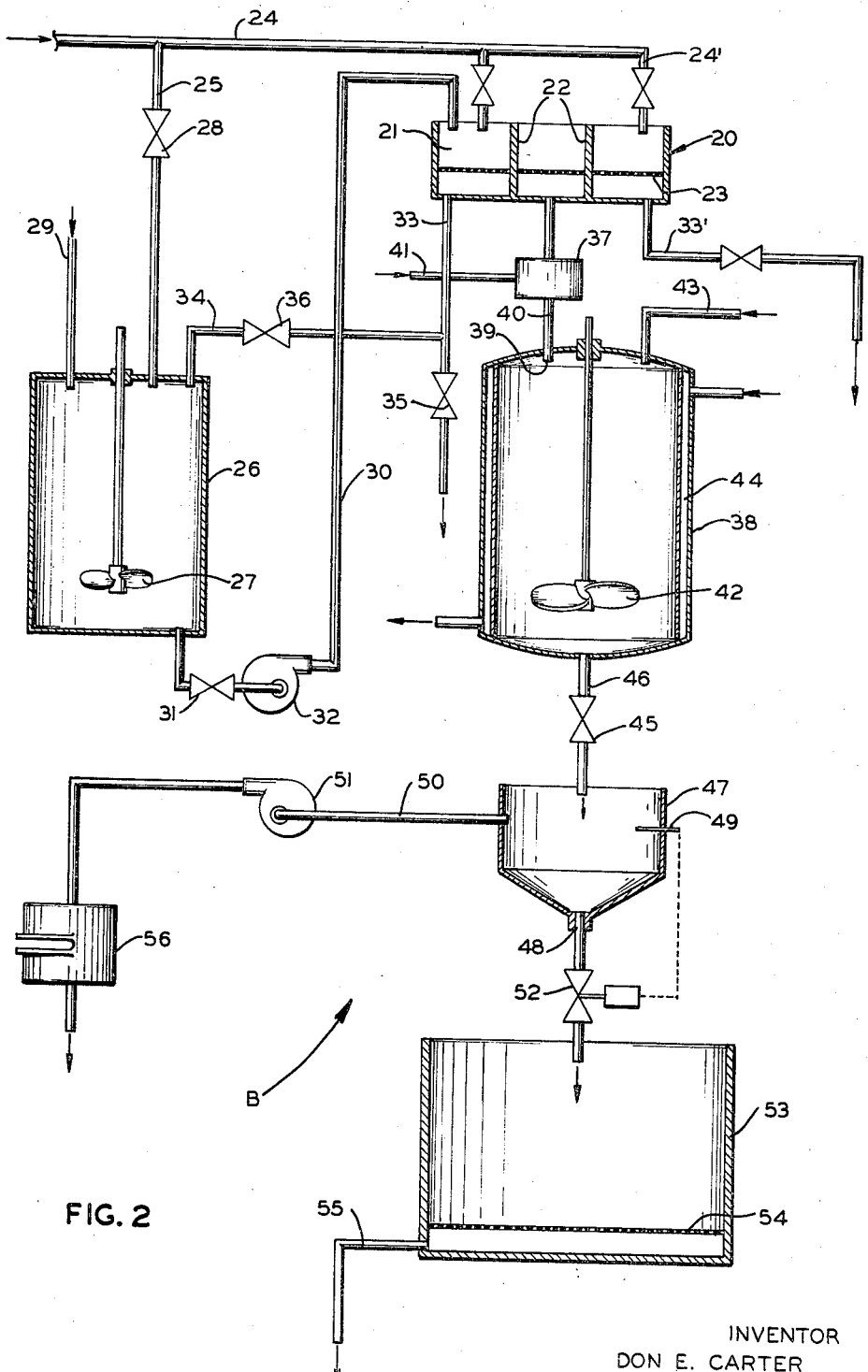

In the accompanying drawings:

FIGURE 1 is a schematic illustration of an apparatus showing the method of recovering a filtrate from a filter cake; and FIGURE 2 is a schematic illustration of an apparatus for continually producing a filter cake to be used in a filtering operation, passing a hydrocarbon product through the filter cake and reclaiming the hydrocarbon product from the filter cake.

General description

Generally speaking, the present invention relates to an apparatus and a method for extracting an organic hydrocarbon from a filter cake. The filtering cake is generally deposited on a filter cloth in order to provide a cake having sufficient interstices and which is sufficiently porous to permit the filtrate to pass therethrough but to retain coloring and small particle impruities. The filter cake, however, tends to adsorb rather large quantities of the filtrate. The filter cake is thereafter removed from the filter cloth and admitted to a mixing tank in the presence of water. The water will preferentially wet the filter cake, thereby displacing the liquid hydrocarbon material on the filtrate. The tank is provided with an agitator in order to insure complete mixing of the filter cake with the water. Moreover, the tank is provided with a steam jacket for slightly heating the contents in order to assist in the removal of the liquid hydrocarbon from the filter cake.

After the contents of the tank have been sufficiently agitated, the agitator movement is stopped and the contents are allowed to settle where the liquid hydrocarbon will form a separate layer on the water-cake slurry. The contents are thereafter withdrawn from the tank where a capacitance probe is able to detect which layer is passing through the discharge tube from the tank. Conventional valve means are provided for bypassing the discharge line to recapture the upper layer of the liquid hydrocarbon. This material is then pumped through a smaller filter where the recycled liquid hydrocarbon can then be reintroduced into the process or collected as desired.

The present invention also provides a method for depositing a filter cake on a leaf type filter, passing a process liquid hydrocarbon through the filter cake, and thereafter separating the adsorbed liquid hydrocarbon from the filter cake. In this alternative process, the main stream of hydrocarbon is introduced to a bare filter cloth where it passes therethrough. A bypass line is connected to the main stream for introduction of the process liquid into a secondary tank. Also introduced into the secondary tank is a filter cake slurry. The discharge of the secondary tank is also introduced into the filter cloth along with the main stream of liquid hydrocarbon. The continued introduction of the filter cake slurry and the main stream begins to form a filter cake on the filter cloth. However, at the outset, the filter cake is not sufficiently thick to remove all of the impurities and the discharge is returned to the secondary tank for recycle again to the filter cloth. After a sufficiently thick filter cake has been accumulated on the filter cloth, the filtrate is permitted to discharge to a suitable receptacle. The horizontal filters, however, intermittently rotate as it is necessary to build up a filter cake on each of the sections or leafs of a rotatable filter plate. After the filter cake has been used for a sufficient amount of time and large quantities of impurities have been collected in the filter cake, the filter cake can be removed from the leaf holding the same and discharged into a suitable receptacle. Water may be employed for washing the filter cake and is the means employed for carrying the same into a mixing tank. Additional water is added to the mixing tank where the water will preferentially wet the filter cake, thereby removing the liquid hydrocarbon contained therein. This tank is continuously agitated and the contents thereof are intermittently admitted to a settling tank disposed therebeneath. In the settling tank, the liquid hydrocarbon layer will separate from the filter cake-water slurry and the liquid hydrocarbon layer can be withdrawn from one source while the liquid-filter cake slurry can be withdrawn from the base of the settling tank. The liquid hydrocarbon which has been withdrawn from the settling tank can then be returned to the process or to a suitable collection area. The filter cake can then be discharged to a suitable collecting tank where the water may be separated therefrom. If the impurities contained in the filter cake are water soluble, the filter cake may again be recycled to the container of filter cake which is admitted to the secondary tank.

Detailed Description

Referring now in more detail and by reference characters to the drawings which illustrate practical embodiments of the present invention, A designates the apparatus for effecting a removal of filtrate from a filter cake, substantially as shown in FIGURE 1. The apparatus A includes a mixing tank 1 provided with an agitator 2 and a plurality of radially spaced axially extending baffles 3 which assist in the agitation. The tank 1 with the components described therein is conventional in its construction and is, therefore, not described in further detail herein. The tank is, however, conventionally provided with a water inlet 4 and a discharge pipe 5. Similarly, a filter cake inlet port 6 is also provided at the upper end of the tank 1.

The process of the present invention is particularly adaptable for removal of filtrates which are adsorbed by a filter cake through which the filtrate is passed. Generally after a period of time, the filter cake becomes saturated with impurities and is no longer usable in an effective manner. However, before discarding the filter cake, it is desirable to remove any of the entrapped and adsorbed filtrate. The filter cake may be deposited in the tank 1 through the inlet port 6. Thereafter, water is added through the water line 4. The amount of water added is at least sufficient to displace the adsorbed liquid hydrocarbon from the filter cake material. In order to assist in the liquid hydrocarbon removal, a steam jacket 7 may be provided around the tank with the conventional inlet and outlet steam lines as illustrated.

The process of the present invention is only applicable where the washing liquid such as water will preferentially wet the filter cake material and thereby displace the process liquid which is generally a liquid hydrocarbon. Another criterion is that the wash liquid, such as the water, must be immiscible with the process liquid so that the wash liquid and process liquid will form two phases at the prevailing temperature. In order to reduce the solubility of the liquid hydrocarbon material in the wash liquid, such as water, a cheap salt may be added to the water. Any of the commercially available inorganic salts are acceptable. A non-limiting and exemplary list of available salts are sodium chloride, calcium chloride, sodium carbonate, sodium phosphate, sodium nitrate, calcium nitrate, potassium chloride, potassium nitrate, potassium carbonate, etc.

The process and appartus of the present invention are applicable to the recovery of a wide variety of liquid organic materials such as aromatic, aliphatic and alicyclic alkanes, alkenes and dienes, polymers, alcohols, ketones, aldehydes, ethers, esters, acids, and various substituted hydrocarbons such as chlorinated hydrocarbons, amines, nitriles and nitro compounds.

A non-limiting list of such aromatic compounds are the commercially available alkyl benzenes in which the alkyl group can be from 1 to 30 carbon atoms in either branched or linear configuration and may be alicyclic. Multi substituted aromatics such as dialkyl benzene may be recovered. Similarly, benzene, toluene, ethylbenzene, n-propyl-benzene, sec-butylbenzene, t-butylbenzene, n-dodecylbenzene, xylenes, ethyltoluene, n-butyltoluene, n-dodecyltoluene, and phenyl cyclohexane may be recovered.

Some of the chlorinated hydrocarbons which may be recovered in the process of the present invention are trichloroethylene, tetrachloroethylene, trichloromethane, carbon tetrachloride, chlorobenzene, dichlorobenzene, trichlorobenzene, chlorotoluene, dichlorotoluene, trichlorotoluene, tribromoethylene, tetrabromoethylene, carbon tribromide, carbon tetrabromide, bromobenzene, dibromobenzene, tribromobenzene, bromotoluene, dibromotoluene, tribromotoluene, etc.

As indicated above, many petroleum ethers, ethers in general and ketones are also applicable for recovery in the process of the present invention. A non-limiting list of these compounds are dimethylether, diethylether, methyl ethyl ether, dibutylether, di-n-butylether, di-tert-butylether, dimethylketone, diethylketone, methylethylketone, methylpropylketone, dipropylketone, methyl-n-propylketone, diisohexylketone, methyl isohexylketone, etc. It can thus be seen that any of a wide variety of liquid hydrocarbons may be recovered in the process of the present invention. In fact, any hydrocarbon which is capable of being displaced from a solid material by a liquid and which is not soluble in a liquid can be recovered by this process.

For convenience, the following table provides specific non-limiting examples of the classes of compounds listed above.

Table I

| Compound class: | Examples |
| --- | --- |
| Aromatics | Benzene, naphthalene. |
| Aliphatic | Decane, isoheptane, 2,2,4-trimethyl pentane. |
| Alicyclic | Cyclopentane, isopropyl, cyclohexane, bicyclohexane. |
| Alkene | n-Decene, propylene tetramer. |
| Diene | Butadiene. |
| Polymer | Polyethylene wax. |
| Alcohols | n-Butanol, isohexanol. |
| Ketones | Methyl isobutyl ketone, cyclohexane. |
| Aldehydes | Benzaldehyde, caproaldehyde. |
| Ethers | Diethyl ether, anisole. |
| Esters | Ethyl acetate, butyl benzoate. |
| Acids | Oleic acid, stearic acid. |
| Chlorinated hydrocarbons | Trichloroethylene. |
| Amines | Dodecyl amine, aniline. |
| Nitrites | Butyronitrile. |
| Nitro compounds | Nitrobenzene. |

Some of the solid filter cake materials which are used in the present invention are kieselguhr, often known as diatomaceous or infusorial earth, cakes of asbestos fibers, activated charcoal, etc.

After the water is thoroughly mixed with the filter cake and process liquid mixture, and the water has displaced the process liquid hydrocarbon from the filter cake, the agitator 2 is turned off and the contents of the tank 1 are allowed to settle where two phases are formed. The water and the filter cake material, which is the more dense material, will settle at the lower portion of the tank and the lighter liquid hydrocarbon will form an upper layer thereon with a distinct interface between the two layers. In fact, it has been found in the present invention that there must be a sufficient density difference to separate the two phases. At least 0.005 gram per cubic centimeter as a density difference has been found to be sufficient.

After the two layers have formed, the lower layer is withdrawn from the bottom of the tank 1 through the discharge tube 5. A conventional capacitance probe 8 interposed in the discharge tube 5 is capable of determining which of the two layers is passing through the discharge tube 5. The capacitance probe 8 is electrically connected to an electrically operable solenoid valve 9 of conventional construction in the manner as schematically illustrated in FIGURE 1. During the portion of the time that the lower layer containing the wash water and filter cake material are passing through the capacitance probe 8, the solenoid valve 9 will remain open permitting the washliquid, filter cake slurry to pass into a liquid-solid separator tank 10. The tank 10 is generally of any conventional construction and may be provided with a false-bottom filter plate 11 which may be formed of any foraminous or screen material. The slurry of wash water and filter cake is deposited on the filter 11 permitting the water to pass through and leaving a solid filter cake material deposited thereon. The water passing through the filter 11 may be drained through a conventional discharge pipe 12. The solid filter cake, which is deposited on the filter 11, may sometimes be reused in the process of producing the filtrate (not described herein). If the impurities contained in the original filter cake at the time of removal from the process filter were water soluble, these impurities would have been removed in the mixing tank 1 and the filter cake would be reusable. If the process impurities contained in the filter cake were not water soluble and were not removed in the mixing tank 1, the filter cake deposited on the filter 11 probably would not be reusable and the same could be discarded. In any event, the filter cakes generally employed are not particularly expensive and may be discarded as desired.

As the wash liquid-filter cake layer has passed the capacitance probe, the capacitance will change when the liquid hydrocarbon layer passes therethrough. Upon a sensing of change of layer, the capacitance probe will excite the solenoid coil of the solenoid valve 9, thereby closing the same. A bypass line 13 connected to the discharge pipe 5 will recycle the liquid hydrocarbon through a small filter 14 and return the same to the process stream. A small pump 15 may be employed for the purpose of passing the process liquid through the filter 14. The filter 14 is conventional in its construction and is, therefore, not described in further detail herein. The filter employed would be dependent upon the type of liquid hydrocarbon which is being recycled. Thus, it can be seen that the process and the apparatus of the present invention is particularly adaptable to the quick and efficient removal of process liquids from filter cakes without the addition of any expensive solvent. Furthermore, it has been found in connection with the present invention that as much as 90% recovery of the process liquid is obtainable. If the organic material being recovered is more dense than the water or salt solution, this layer will naturally settle to the bottom of the tank 1 and will be removed first. In such event, the capacitance probe 8 and solenoid valve 9 are relocated or adjusted to admit the first layer discharged from the tank 1 to the bypass line 13.

It is possible to provide a modified form of apparatus and process B of the present invention which is designed to produce filter cakes and recover a process filtrate from the filter cake thus produced after the filter cake has served a useful life. The apparatus and process for this embodiment is more specifically illustrated in FIGURE 2 herein. The apparatus B of the present invention is designed to be used with the horizontal type filter which is divided into discreet and separately operable sections, the various sections generally separated by partitions, such as the Oliver horizontal filter. This type of filtering mechanism is more fully illustrated in the third edition of the Chemical Engineer's Handbook by McGraw Book Company, Inc., 1950, page 981. The type of filter unit employed is a continuous vacuum filter with a rigid filter surface rotated in a horizontal plane. This filter unit is represented by the reference numeral 20 in FIGURE 2 and includes a series of annularly spaced, pie-shaped filter sections 21. The width of the annular surface of each section varies with the size of the total unit which may be as large as 15 ft. in diameter. Each of the sections 21 is separated from each other by partitions 22 and each includes a cloth filter 23. The type of filter 23 is not critical and may be changed or substituted depending upon the type of filtrate which is to be passed therethrough. The filters 23 are preferably mounted on a swingable plate which may be removed from the filtering position as shown in FIGURE 2. The segments preferably are separately removable. Moreover, the annular surface has spaced walls approximately 6 inches high around the inner and outer rims which restrain the flow of feed. This filter unit is not described in further detail herein inasmuch as the filter unit 21, per se, does not, in and of itself, constitute part of the present invention.

The apparatus B includes a main stream or process line 24 carrying the process liquid to one of the filter sections 21, substantially as shown in FIGURE 2. A bypass line 25 is connected to the main stream process line 24 and discharges into a secondary mixing tank 26, the latter being conventionally provided with an agitator 27. A valve 28 for regulating the amount of fluid supplied to the secondary tank 26 or to the filter section 21 is interposed in the bypass line 25. A container of filter cake (not shown) has the discharge port 29 of said container opening into the secondary tank 26. Thus, the filter cake and process liquid may be added to the secondary tank 26 to form a slurry. This slurry is then admitted to the filter section 21 through a slurry line 30, which is also conventionally provided with a valve 31 and a pump 32. Thus, as the slurry is pumped into the filter 23 of the filter section 21, a filter cake will begin to be deposited upon the filter 23. However initially, the filter cake has not formed with sufficient thickness to remove all impurities contained in the process liquid from the line 24. Accordingly, the process fluid which is withdrawn from the filter section 23 through a filtrate or discharge line 33 is recycled to the secondary tank 26 by means of a recycle line 34. The filtrate line 33 and the recycle line 34 are conventionally provided with control valves 35, 36, respectively for controlling the amount of liquid from the filter 23, which is recycled to the secondary tank 26.

During the start of the process for building a filter cake on the filter 23, the valve 35 is generally closed and the valve 36 is opened so that almost the entire amount of filtrate which is admitted to the section 21 is returned to the secondary tank 26. Additionally, the valve 28 is opened so that the majority of the process liquid from the main stream 24 passes into the secondary tank 26. Similarly, the valve 31 is opened so that a large quantity of slurry passes into the filter section 21. As a sufficiently thick cake has been deposited on the filter 23, the valve 28 may be closed preventing the addition of process liquid to the secondary tank 26. Similarly, the valve 31 is closed in order to prevent further build-up of cake on the filter 23. Also, the valve 36 is closed and the valve 35 is opened, thereby preventing any further filtrate from recycling through the recycling line 34 to the secondary tank 26. The filtrate which passes through the filtrate line 33 may then be collected and used as desired.

Each of the various filter sections is rotated so that they are passed beneath the main stream 24 and the slurry line 30 in order to build up a sufficiently sized filter cake on the filter 23. Furthermore, additional main stream lines 24' may be provided for various sections 21 in order to provide continuous filtering action through a plurality of the sections. Similarly, additional discharge lines 33' would be provided on these various sections. Each of the additional main stream lines 24' and the additional discharge lines 33' would be provided with the necessary valves as illustrated. The various sections 21 may be rotated intermittently, or continuously. However, as the filter cakes in each of the sections 21 are used for an extended period of time, the impurities which have been filtered from the process liquid accumulate in the filter cake, thereby reducing the overall effectiveness of the filter cake and hence substantially reduce the efficiency of the filtering action. Therefore, this filter cake can be removed by any conventional mechanism. The plates forming the sections 21 and which hold the filter 23 may be removed for manual scraping and removal of the filter cake or a screw type spiral-screwel may be employed to scrape the filter cake from the filter. This may be performed at one selected station through the arcuate rotation of the main plate or the main frame.

The filter cake which has been removed from the filter 23 in the section 21 is then deposited in a chamber or bin 37 which is disposed beneath the section 21, substantially as shown in FIGURE 2. The filter cake, as indicated above, will contain a substantial quantity of the process liquid admitted to the filter by the main stream 24. The filter cake is then introduced into a mixing tank 38 through an inlet port 39. The filter cake may be physically removed by a spatula or any other mechanical means of physically transporting the cake and depositing it in the mixing tank 38. It has also been found that quantities of the filter cake may be carried through a fluid line 40 on the discharge side of the bin 37 and which communicates with the inlet port 39 in the tank 38. Water through a line 41 may be admitted to the bin 37 for physically carrying a selected quantity of the filter cake through the line 40 and into the tank 38. The tank 38 is also conventionally provided with an agitator 42 and a wash liquid inlet line 43, the wash liquid preferably being water.

The amount of water added is at least sufficient to displace the adsorbed liquid hydrocarbon from the filter cake material. In order to assist in the liquid hydrocarbon removal from the filter cake, the tank 38 is provided with a steam jacket 44, the latter also being provided with conventional inlet and outlet steam lines as illustrated.

Again, the process of the present invention is only applicable where the washing liquid such as water will preferentially wet the filter cake material and thereby displace the process liquid. Again, the other criterion is that the wash liquid such as water must be immiscible with the process liquid. In other words, the process liquid must not be soluble in the water so that the two will form two phases at the prevailing temperature. The solubility of the liquid hydrocarbon in the wash water is also reduced by the addition of a cheap inorganic salt to the water which is admitted through the inlet pipe 43. The process of the present invention is useful with the aforementioned list of liquid hydrocarbons and the aforementioned list of filter cake material, which are used in the apparatus A. The water admitted through the water line 43 is thoroughly mixed with the filter cake in the process liquid mixture where the water displaces the process liquid hydrocarbon from the filter cake. The agitator 42 is continually actuated in order to provide continual stirring and thorough mixing of the components.

After a predetermined time where thorough mixing has occurred, a valve 45 in the discharge line 46 from the tank 38 is opened permitting the contents thereof to pass into a settling tank 47. The mixing tank 38 and the settling tank 47 are conventional in their construction and are, therefore, not described in detail herein. The contents which have been admitted to the settling tank 47 are allowed to settle where two phases are formed. The water and filter cake, which is the more dense material, will settle at the lower portion of the tank and the liquid hydrocarbon, which is lighter, will form an upper layer thereon with a distinct interface between the two layers. After the two layers have formed, the lower layer is withdrawn from the bottom of the tank 47 through a discharge tube 48. A conventional capacitance probe 49 similar to the capacitance probe 8, is mounted in the side wall of the settling tank 47 for determining the position of the two layers therein. A filtrate line 50 is also connected to the settling tank 47 and designed to withdraw the accumulated liquid hydrocarbon by means of a pump 51. The line 50 is located slightly above the level of the capacitance probe 49. Again, the capacitance probe 49 is connected to a solenoid actuable valve 52 in the discharge line 48 so that the valve 52 will close when the level of the hydrocarbon layer has reached a certain point in the settling tank 47.

The material passing through the discharge line 48 is admitted to a liquid-solid seperator tank 53 which is substantially similar to the previously described liquid-solid separator tank 10. The tank 53 is similarly of any conventional construction and is provided with a false bottom filter plate 54, which may be formed of a screen or foraminous material. The slurry of wash water and filter cake is deposited on the filter plate 54 permitting the water to pass through and leave a solid filter cake material deposited thereon. The water passing through the filter plate 54 may be drained through a conventional discharge pipe 55. The solid filter cake which is deposited on the filter plate 54 may be re-used in the process of producing the filtrate, this process not being described herein. If the impurities contained in the original filter cake at the time of removal from the proces filter, were water soluble, these impurities would have been removed in the mixing tank 38 and the filter cake would be re-usable. However, if the process impurities contained in the filter cake were not water soluble and were not removed in the mixing tank 38, the filter cake deposited on the filter would not be re-usable and could be discarded.

The filtrate withdrawn through the filtrate line 50 from the settling tank 47 is then passed through a conventional filter 56 where the liquid hydrocarbon can be again recycled to the process stream. The filter 56 is substantially similar to the filter 14 and is, therefore, not described in further detail herein. The filter employed is again, of course, dependent upon the type of liquid hydrocarbon which is being filtered in the process.

It can be seen that the alternative process of the present invention is particularly adaptable to producing filter cakes on leaf type filters and extracting or removing the filtrate contained in the filter cake after the useful life of the filter cake has been served. It has been found in connection with the present invention that in many filtration systems at least 90 percent of the filtrate is recoverable from the filter cake.

The invention is further illustrated by but not limited to the following examples.

Example 1

The object of the following example was to determine whether or not it was possible to recover an alkyl benzene from a diatomaceous earth filter cake by slurrying the filter cake with water and displacing the alkyl benzene from the filter cake.

Ten grams of a porous diatomaceous earth filter cake were added to a separating funnel. The diatomaceous earth filter cake had previously been used to filter an alkyl benzene for removal of color from the alkyl benzene. Fifteen cubic centimeters of tap water were added to the separating funnel and the funnel was vigorously shook so that a slurry was formed in the funnel in which drops of clear liquid hydrocarbon could be seen. An additional fifteen cubic centimeters of tap water was charged and shaking was vigorously continued for two minutes. The contents of the separating funnel was thereafter permitted to settle. Two layers in the separating funnel were formed. A lower layer of water and diatomaceous earth was formed and this lower layer was drained from the filter funnel. The upper layer was thereafter collected and showed evidence of every little suspended filter aid contained therein. Approximately 4.42 grams or 44.2% of the original filter cake charge was contained therein.

Two cubic centimeters of benzene was added to the slurry and the slurry was agitated. The mixture was then allowed to settle and approximately 1 cubic centimeter of the benzene layer was recovered. Refractive indices were determined for each of the three layers. The first organic layer which contained the alkyl benzene had a refractive index of approximately 1.413; the benzene layer had a refractive index of approximately 1.4913 and the pure benzene had a refractive index of 1.4985, at 24° C. The mathematical calculations indicated that 5.44 grams of the total alkyl benzene was present in the feed cake, and 4.42 grams was recovered. Therefore, there was an 81.5% recovery of the alkyl benzene. It was also determined that the amount of recovery is increased by heating the reactants during agitation.

Example 2

The above process as employed in Example 1 was again repeated to determine the possibility of recovering other liquid hydrocarbons from diatomaceous earth filter cakes. The above procedure was followed for each of carbon tetrachloride, benzene, petroleum and methylethyl ketone. In each case, it was found that at least 80% of the liquid hydrocarbon was recovered.

It should be understood that changes and modifications in the form, construction, arrangement and combination of parts presently described and pointed out may be made and substituted for those herein shown without departing from the nature and principle of my invention.

Having thus described my invention what I desire to claim and secure by Letters Patent is:

1. In a system for applying a filter-cake to a filter capable of passing process liquids therethrough and for recovering the process liquid from the filter-cake, said system having apparatus comprising:
   (a) a filter,
   (b) a secondary tank containing said filter-cake material,
   (c) means for introducing said process-liquid into said secondary tank to form a process-liquid filter-cake material slurry,
   (d) slurry inlet means operatively connecting said filter and secondary tank for introducing said slurry into said filter,
   (e) recycling means operatively connecting said filter and secondary tank for recycling the liquid passing through said filter to said secondary tank until a sufficient filter-cake has formed on said filter,
   (f) means connected to said slurry inlet means and recycling means for ceasing the addition of slurry into said filter and ceasing the recycle thereof,
   (g) collections means operatively connected to said filter for collecting the filter-cake when it is removed from said filter,
   (h) a mixing tank operatively connected to said collection means for holding said filter-cake,
   (i) means operatively connected to said mixing tank for introducing a wash-liquid into said mixing tank,
   (j) a settling tank operatively connected to and being located on the discharge side of said mixing tank for forming a process-liquid layer and a wash-liquid filter-cake layer,
   (k) means operatively associated with said settling tank for separately removing the process-liquid and the filter-cake wash-liquid,
   (l) a capacitance probe operatively associated with said settling tank,
   (m) a control valve operatively located between said mixing tank and said settling tank,
   (n) and control means operable by said capacitance probe to open and close said control valve upon an interface detector between said two layers.

2. In a system for applying a filter-cake to a filter capable of passing process-liquids therethrough and for recovering the process-liquid from the filter-cake, said system having apparatus comprising:
   (a) a filter,
   (b) a secondary tank containing said filter cake material,
   (c) means for introducing said process-liquid into said secondary tank to form a process-liquid filter-cake material slurry,
   (d) slurry inlet means operatively connecting said filter and secondary tank for introducing said slurry into said filter,
   (e) recycle means operatively connecting said filter and secondary tank for recycling the liquid passing through said filter to said secondary tank and back through said slurry inlet means until a sufficient filter-cake has formed on said filter,
   (f) valve means in said slurry inlet means for ceasing the addition of slurry into said filter,
   (g) valve means in said recycle means for ceasing the recycling of the liquid passing through said filter,
   (h) filter-cake withdrawance means operatively connected to said filter for withdrawing the filter-cake from the filter after an accumulation of impurities thereon, (i) collection means operatively connected to said withdrawance means for collecting the filter-cake and process-liquid when it is removed from said filter, (j) a mixing tank operatively connected to said collection means for holding said filter-cake, (k) means connected to said mixing tank for introducing a wash-liquid into said mixing tank where the wash-liquid preferentially wets the filter-cake and is immiscible with the process-liquid, (l) a settling tank operatively connected to said mixing tank and being located on the discharge side of said mixing tank, (m) agitator means in said mixing tank for forming a process-liquid layer and a wash-liquid filter-cake layer, (n) separation means operatively connected to said mixing tank for separately removing the process liquid and the filter-cake wash-liquid, (o) a capacitance probe operatively associated with said settling tank, (p) a control valve operatively located between said mixing tank and said settling tank, and (q) control means operable by said capacitance probe to open and close said control valve upon an interface detector between said two layers.

References Cited

UNITED STATES PATENTS

| | | | |
|---|---|---|---|
| 1,579,171 | 3/1926 | Zoul | 210—75 XR |
| 1,915,433 | 6/1933 | Mann et al. | 208—305 |
| 2,006,088 | 6/1935 | Mitchell | 208—305 |
| 2,214,671 | 9/1940 | Hagan | 210—75 XR |
| 2,236,679 | 4/1941 | Ferguson et al. | 208—305 |
| 2,200,145 | 5/1940 | Barton | 208—305 |
| 3,376,977 | 4/1968 | Gordon et al. | 210—114 |

DELBERT E. GANTZ, Primary Examiner

C. E. SPRESSER, Assistant Examiner

U.S. Cl. X.R.

208—305; 210—114, 193, 262, 294, 295; 260—671, 674